(12) United States Patent
Mitani et al.

(10) Patent No.: US 6,493,626 B2
(45) Date of Patent: Dec. 10, 2002

(54) DRIVE POWER CONTROL APPARATUS AND METHOD FOR VEHICLE

(75) Inventors: Shinichi Mitani, Susono (JP); Zenichiro Mashiki, Nisshin (JP); Isao Takagi, Okazaki (JP); Hirofumi Kubota, Mishima (JP); Hiroya Tanaka, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/858,465

(22) Filed: May 17, 2001

(65) Prior Publication Data

US 2001/0044687 A1 Nov. 22, 2001

(30) Foreign Application Priority Data

May 19, 2000 (JP) ........................................ 2000-147760

(51) Int. Cl.$^7$ ................................................. F16H 9/18
(52) U.S. Cl. ........................... 701/103; 701/54; 477/34; 477/43; 123/704
(58) Field of Search ................................ 701/103, 104, 701/106, 54; 477/34, 37, 41, 42, 43; 123/704, 700, 486

(56) References Cited

U.S. PATENT DOCUMENTS 5,243,881 A * 9/1993 Hayashi ........................ 74/856

FOREIGN PATENT DOCUMENTS

JP 11-198684 A 7/1999

* cited by examiner

Primary Examiner—William A. Cuchlinski, Jr.
Assistant Examiner—Arthur D. Donnelly
(74) Attorney, Agent, or Firm—Oliff & Berridge, PLC

(57) ABSTRACT

An engine output for bringing the drive power of a motor vehicle to a requested value is determined as a target output. One of the lean burn and the stoichiometric burn is selected as a combustion form that achieves a best fuel consumption performance in terms of the control of the actual engine output to the target output. That is, an output value that serves as a criterion for determining whether to switch the combustion force is determined based on the minimum fuel consumption rate during the stoichiometric-burn operation and the minimum fuel consumption rate during the lean-burn operation in which the fuel consumption involved in the rich spike control is taken into account. If the target output is less than the output value, the lean-burn operation is performed. If the target output is greater than the output value, the stoichiometric-burn operation is performed.

13 Claims, 6 Drawing Sheets

DRIVE POWER CONTROL APPARATUS AND METHOD FOR VEHICLE

INCORPORATION BY REFERENCE

The disclosure of Japanese Patent Application No. 2000-147760 filed on May 19, 2000 including the specification, drawings and abstract is incorporated herein by reference in its entirety.

BACKGROUND OF THE INVENTION

1. Field of the Invention

The present invention relates to a vehicle drive power control apparatus and a drive power control method.

2. Description of the Related Art

In vehicles equipped with an internal combustion engine and a continuously variable transmission, it is recently demanded to improve the fuel economy of the internal combustion engine while maintaining a requested value of the vehicle drive power.

To meet such a demand, a drive power control apparatus described in Japanese Patent Application Laid-Open No. HEI 11-198684, as for example, performs an overall control (coordinative control) of the torque of the internal combustion engine and the speed ratio of the continuously variable transmission (the input rotation speed thereof). That is, when adjusting the engine output so as to bring the vehicle drive power to a target value, the control apparatus controls the speed ratio of the continuously variable transmission so that the engine revolution speed (the input rotation speed of the continuously variable transmission) will become equal to a value that optimizes the fuel consumption, and at the same time, controls the torque of the internal combustion engine to a target value.

Furthermore, with regard to the internal combustion engine installed in the vehicle as described in the aforementioned laid-open patent application, the form of combustion can be changed between the lean burn and the stoichiometric burn. The combustion form of the internal combustion engine is controlled so as to achieve a combustion form that realizes a fuel consumption performance that is optimal to bring the vehicle drive power to the target value. That is, according to the aforementioned laid-open patent application, the fuel consumption performance in the lean burn operation and the fuel consumption performance in the stoichiometric burn operation are compared beforehand. When the vehicle drive power is to be brought to a target value, the control apparatus selects one of the combustion forms that will achieve a better fuel consumption performance, in accordance with the present state of engine operation.

In internal combustion engines that perform lean-burn operation, a NOx storage-reduction catalyst that adsorbs and stores oxides of nitrogen (NOx) is provided in the exhaust system. During the lean-burn operation, NOx in exhaust gas is adsorbed to the catalyst so as to lessen NOx emissions. Furthermore, during the lean-burn operation, a rich spike control of temporarily achieving a fuel-rich air-fuel ratio is performed to conduct a rich combustion, so that the NOx adsorbed by the NOx storage-reduction catalyst is reduced into nitrogen ($N_2$) by hydrocarbons (HC) and the like present in exhaust gas. Thus, Nox saturation of the NOx storage-reduction catalyst is substantially prevented.

However, if the rich spike control is performed during the lean-burn operation, the fuel consumption performance deteriorates by an amount of fuel consumption involved in the rich spike control, in comparison with the case where only the lean-burn operation is performed. Therefore, in the cases where the rich spike control is performed at a high frequency during the lean-burn operation, as for example, the fuel consumption involved in the rich spike control increases, so that in some cases, execution of the stoichiometric burn instead of the lean-burn operation would provide a better fuel consumption performance. If the fuel consumption performance during the lean burn and the fuel consumption performance during the stoichiometric burn are reversed in the superiority as mentioned above, the selection of a combustion mode based merely on the comparison between the fuel consumption performance achieved during the stoichiometric burn operation and the fuel consumption performance achieved during the lean-burn operation where the rich spike control is not considered involves a possibility of performing a combustion mode (lean burn) that is not favorable in fuel consumption performance and of failing to achieve a sufficient improvement in the fuel consumption performance of the internal combustion engine.

SUMMARY OF THE INVENTION

The invention has been accomplished in view of the aforementioned circumstances. It is an object of the invention to provide a drive power control apparatus and a drive power control method for a vehicle equipped with an internal combustion engine in which a rich spike control is performed during a lean-burn operation, the apparatus and the method being capable of precisely improving the fuel consumption performance of the vehicle.

Means for achieving the aforementioned object, and operation and advantages of the means will be described below.

To achieve the aforementioned object, a drive power control apparatus and a drive power control method in accordance with a first mode of the invention are applied to a vehicle that includes an internal combustion engine that changes a combustion form between a lean burn and a stoichiometric burn and that performs a rich spike control of temporarily shifting an air-fuel ratio to a fuel-rich air-fuel ratio during a lean-burn operation, and a continuously variable transmission connected to an output shaft of the engine. An engine output for bringing the drive power of the vehicle to a target value is determined as a target output, and the torque of the internal combustion engine is controlled so that the actual engine output reaches the target output. The control apparatus and the control method perform the lean burn when the target output is less than an output value set based on a minimum fuel consumption rate during the stoichiometric-burn operation and a minimum fuel consumption rate during the lean-burn operation in which a fuel consumption involved in the rich spike control is taken into account. The apparatus and the method perform the stoichiometric burn when the target output is greater than the output value.

According to the above-described construction, the output value that serves as a criterion for determining whether to switch the form of combustion is set based on the minimum fuel consumption rate during the stoichiometric-burn operation, and the minimum fuel consumption rate during the lean-burn operation in which the fuel consumption involved in the rich spike control is taken into account, instead of the minimum fuel consumption rate obtained when the lean-burn operation is simply performed.

Therefore, when the actual engine output is controlled to the target output, a form of combustion that achieves a best fuel consumption performance can be precisely selected and performed by selecting a form of combustion in accordance with whether the target output is greater or less than the output value. Hence, in the vehicle equipped with the internal combustion engine in which the rich spike control is performed during the lean-burn operation, the fuel consumption performance of the engine can be precisely improved.

It is also practicable to determine the minimum fuel consumption rate during the lean-burn operation in which the fuel consumption involved in the rich spike control is taken into account, and the minimum fuel consumption rate during the stoichiometric-burn operation, while the vehicle is being driven, and to calculate the output value based on the two minimum fuel consumption rates.

According to this construction, the output value that serves as a criterion for determining whether to switch the combustion form is calculated during operation of the vehicle equipped with the internal combustion engine, so that the output value can be set to an appropriate value irrespective of individual variations of the vehicle, the internal combustion engine, etc. Therefore, by selecting and performing a combustion form that achieves a best fuel consumption performance based on the output value and the actual engine output, the fuel consumption performance can be improved more precisely.

The controller may perform the rich spike control so as to reduce a NOx stored in a NOx storage-reduction catalyst, and the controller changes an execution frequency of the rich spike control in accordance with a change in a NOx storing capability of the NOx storage-reduction catalyst provided in an exhaust system of the internal combustion engine. When changing the execution frequency of the rich spike control in accordance with a change in the NOx storing capability of the NOx storage-reduction catalyst, the controller may vary the output value in accordance with the change in the NOx storing capability of the NOx storage-reduction catalyst.

If the execution frequency of the rich spike control is changed in accordance with the NOx storing capability of the NOx storage-reduction catalyst, the minimum fuel consumption rate during the lean-burn operation in which the fuel consumption involved in the rich spike control is taken into account also changes. According to the above-described construction, the output value that serves as a criterion for determining whether to switch the form of combustion in accordance with the NOx storing capability of the NOx storage-reduction catalyst is variable, so that the output value can be set to an appropriate value even though the execution frequency of the rich spike control is changed. By selecting and performing the form of combustion based on the actual engine output and the variable output value, the fuel consumption performance can be improved more precisely.

The output value may be varied in accordance with the speed of the vehicle as well as the NOx storing capability.

In the control of the actual engine output to the target output P, the drivability during the lean-burn operation and the drivability during the stoichiometric-burn operation differ from each other. During the lean-burn operation, the drivability in a high engine output region deteriorates more as the vehicle speed V increases. According to the above-described construction, however, the output value that serves as a criterion for determining whether to switch the form of combustion is variable in accordance with the vehicle speed, which is a parameter that affects the drivability. Therefore, the form of combustion can be selected so that the drivability during the lean-burn operation will not excessively deteriorate.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

A preferred embodiment in which the invention is embodied will be described hereinafter with reference to FIGS. 1 to 6.

Figure 1:
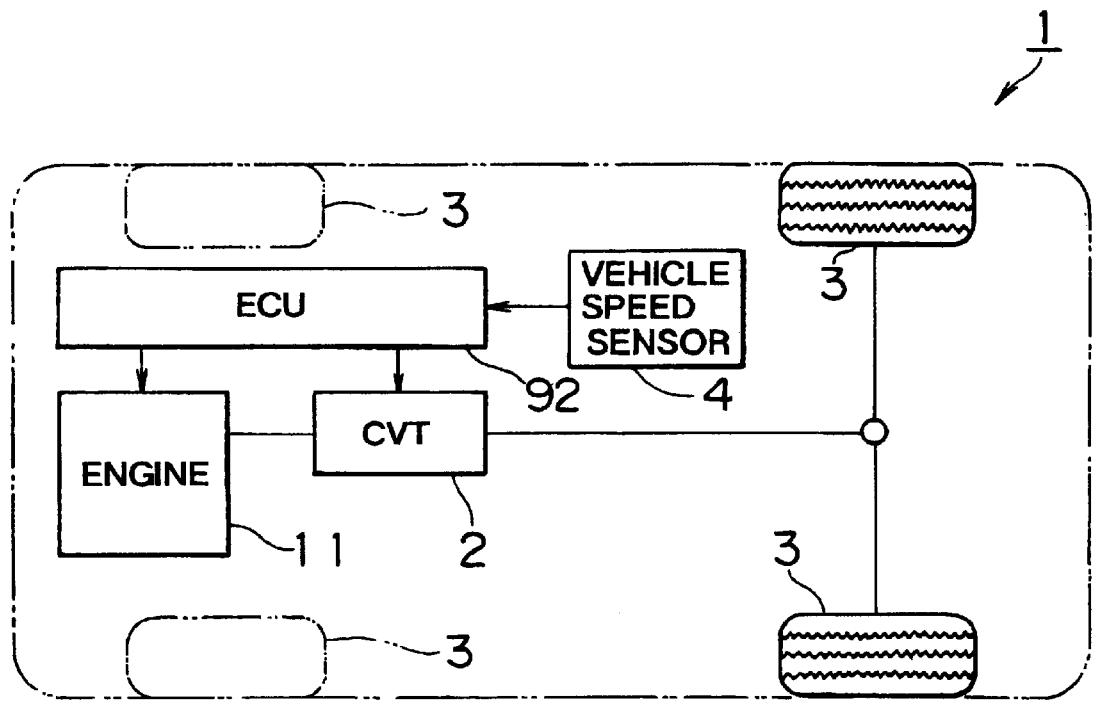
FIG. 1 is a schematic diagram illustrating an overall construction of a vehicle to which a drive power control apparatus in accordance with an embodiment of the invention is applied.

Referring to FIG. 1, a motor vehicle 1 is equipped with an engine 11, a continuously variable transmission 2 (CVT), etc. The continuously variable transmission 2 is connected to a crankshaft 14, that is, an output shaft of the engine 11. The continuously variable transmission 2 is designed to transfer rotation of the crankshaft 14 to wheels 3 of the motor vehicle 1. Rotation of the crankshaft 14 is thus transferred to turn the wheels 3, so that the motor vehicle 1 moves. The continuously variable transmission 2 is capable of steplessly adjusting the ratio (speed ratio) between the input rotation speed (rotation speed on the engine side) and the output rotation speed (rotation speed on the wheel side).

The motor vehicle 1 is provided with a vehicle speed sensor 4 for detecting the vehicle speed, and an electronic control unit (hereinafter, referred to as "ECU") 92 that controls the engine 11 and the continuously variable transmission 2. The ECU 92 performs overall control (coordinative control) of the engine 11 and the continuously variable transmission 2, so as to adjust the drive power of the motor vehicle 1 to a requested value (target value) and to achieve an improved fuel consumption performance. More specifically, the ECU 92, when adjusting the output of the engine 11 so as to bring the drive power of the engine 11 to a target value, controls the torque of the engine 11 to a target value, and at the same time controls the speed ratio of the continuously variable transmission 2 so that the engine revolution speed (the input rotation speed of the continuously variable transmission 2) reaches a value that provides an optimal fuel consumption.

The construction of the engine 11 will next be described in detail with reference to FIG. 2.

Figure 2:
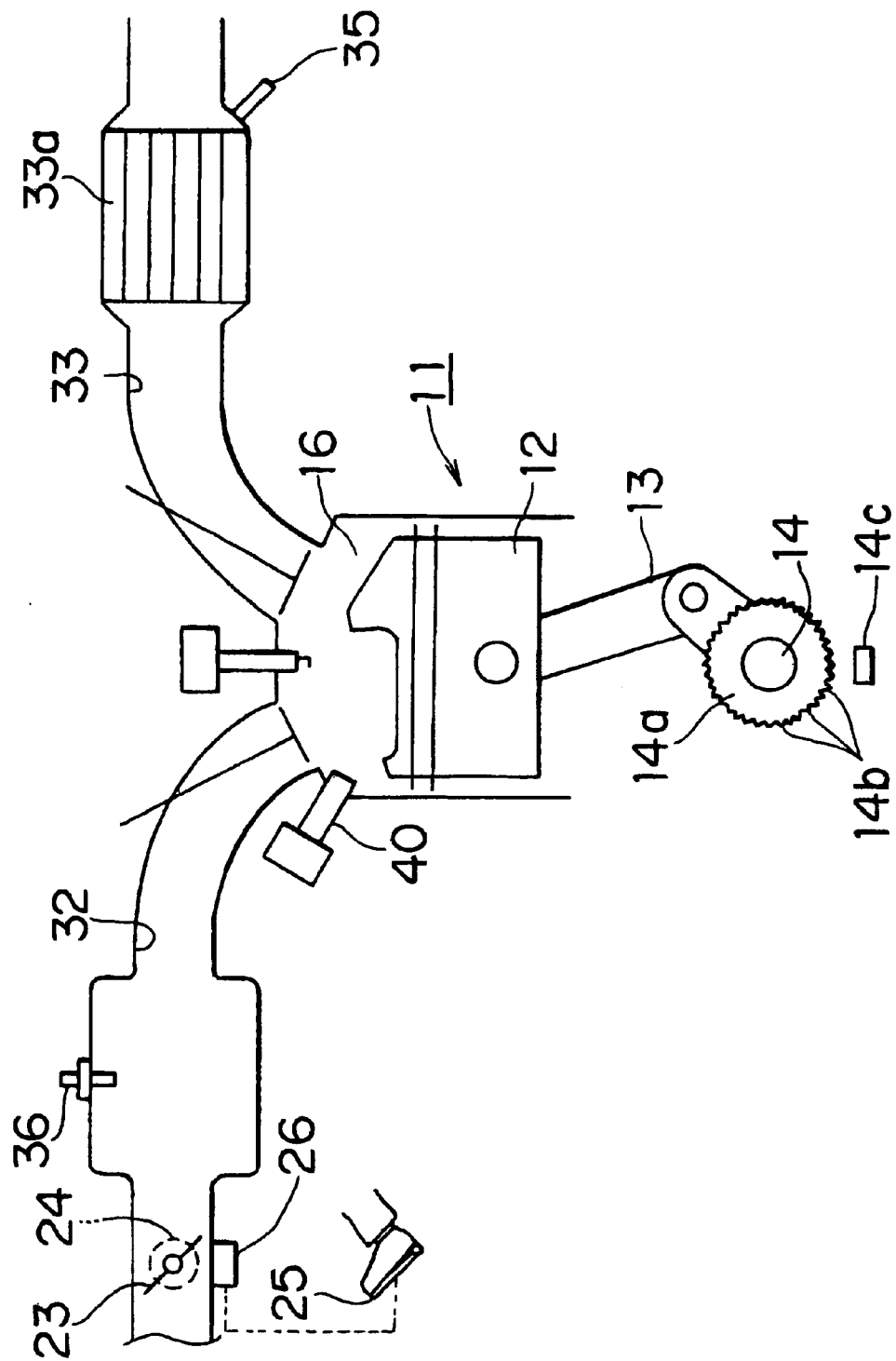
FIG.2 is a schematic diagram illustrating an internal construction of an engine installed in the vehicle.

As shown in FIG. 2, a piston 12 of the engine 11 is connected to the crankshaft 14 via a connecting rod 13 so that reciprocating movements of the piston 12 are converted into rotations of the crankshaft 14 by the connecting rod 13. The crankshaft 14 is provided with a signal rotor 14a that has a plurality of projections 14b. Provided at a side of the signal rotor 14a is a crank position sensor 14c that outputs a pulse-like signal corresponding to each projection 14b as the crankshaft 14 turns.

An intake passage 32 and an exhaust passage 33 are connected to a combustion chamber 16 of the engine 11. An upstream portion of the intake passage 32 is provided with a throttle valve 23 for adjusting the amount of intake air introduced into the engine 11. The degree of opening of the throttle valve 23 is adjusted by driving a throttle motor 24 in accordance with the depressing operation on an accelerator pedal 25. More specifically, the amount of accelerator depression, which changes in accordance with the depressing operation on the accelerator pedal 25, is detected by an accelerator position sensor 26. By controlling the throttle motor 24 in accordance with the amount of accelerator depression, the degree of opening of the throttle valve 23 is adjusted. Provided downstream of the throttle valve 23 in the intake passage 32 is a vacuum sensor 36 for detecting the pressure in the intake passage 32 (intake pressure).

The engine 11 is provided with a fuel injection valve 40 that directly supplies fuel into the combustion chamber 16 by injection to form a mixture of fuel and air. Combustion of mixture in the combustion chamber 16 moves the piston 12 back and forth, turning the crankshaft 14. The engine 11 is thus driven. The mixture occurring after combustion in the combustion chamber 16 is pumped out as exhaust into the exhaust passage 33. The exhaust passage 33 is provided with a NOx storage-reduction catalyst 33a that temporarily adsorbs oxides of nitrogen (NOx) in exhaust when air-fuel mixture is burned in a state that is fuel-leaner than a stoichiometric air-fuel ratio state. NOx adsorbed to the NOx storage-reduction catalyst 33a is reduced into nitrogen ($N_2$) by hydrocarbons (HC) in exhaust when combustion of mixture is performed in a state that is fuel-richer than the stoichiometric air-fuel ratio state.

The NOx storing capability of the Nox storage-reduction catalyst 33a varies in accordance with the temperature of the NOx storage-reduction catalyst 33a, the degree of deterioration thereof, etc. The temperature of the NOx storage-reduction catalyst 33a is detected by a catalyst temperature sensor 35. With increases in the temperature of the catalyst 33a, the NOx storing capability thereof gradually decreases. The degree of deterioration of the NOx storage-reduction catalyst 33a is estimated from the accumulated travel distance of the motor vehicle 1, and the like. As the travel distance accumulates and therefore the deterioration of the NOx storage-reduction catalyst 33a progresses, the NOx storing capability of the catalyst 33a gradually decreases.

Figure 3:
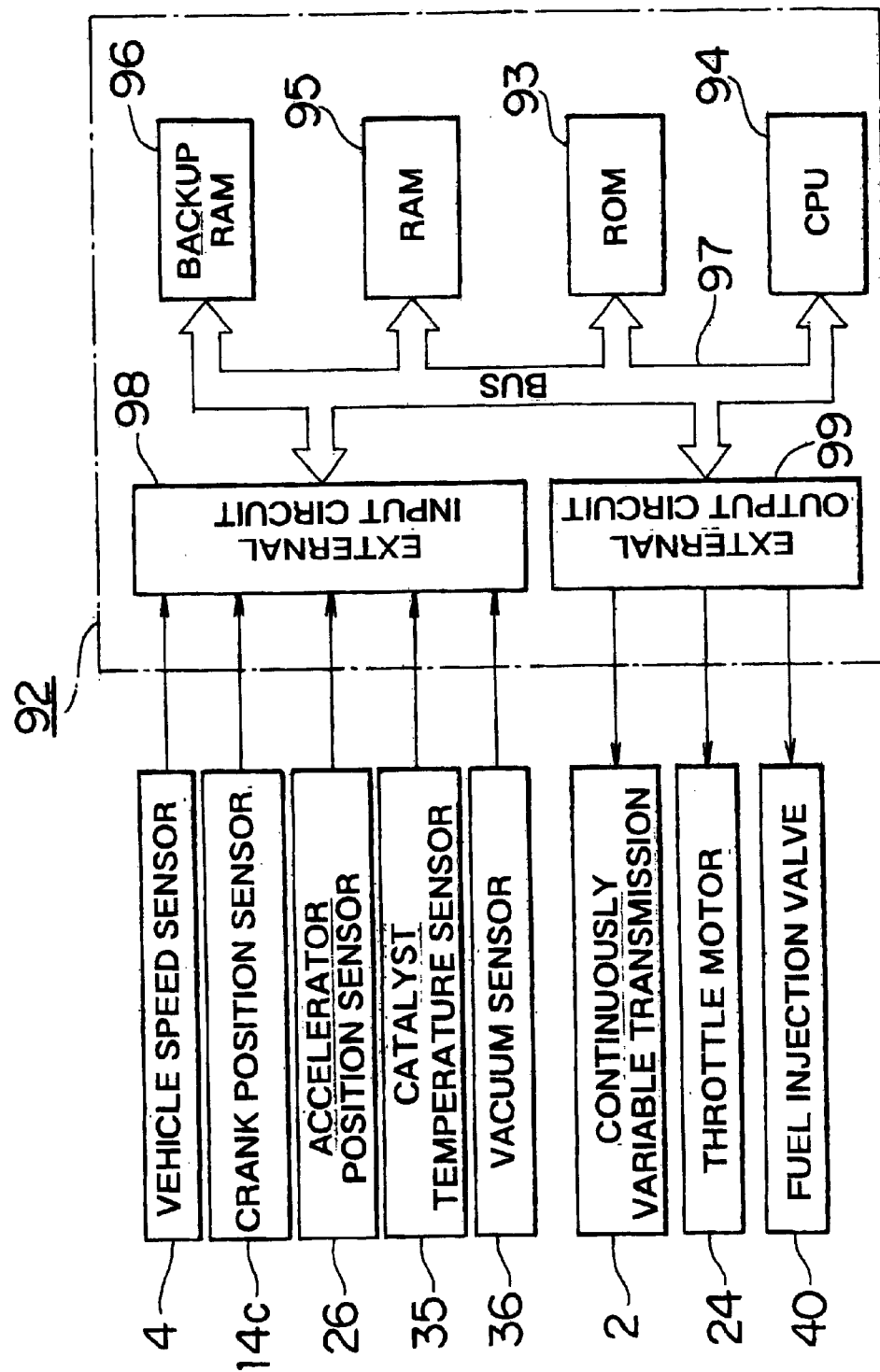
FIG. 3 is a block diagram illustrating an electric construction of the drive power control apparatus.
Figure 4:
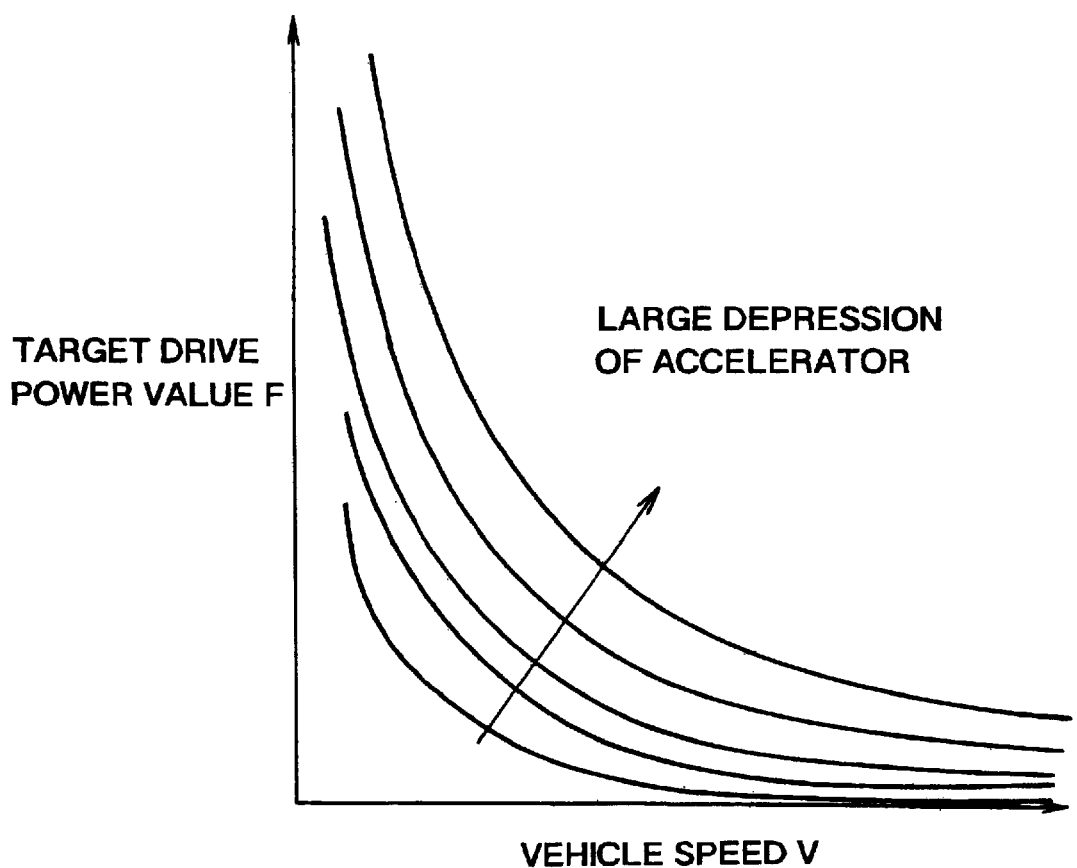
FIG. 4 is a graph indicating tendencies of transition of the target value F of the drive power of the Vehicle with respect to changes in the vehicle speed V and the accelerator depression amount ACCP.
Figure 5:
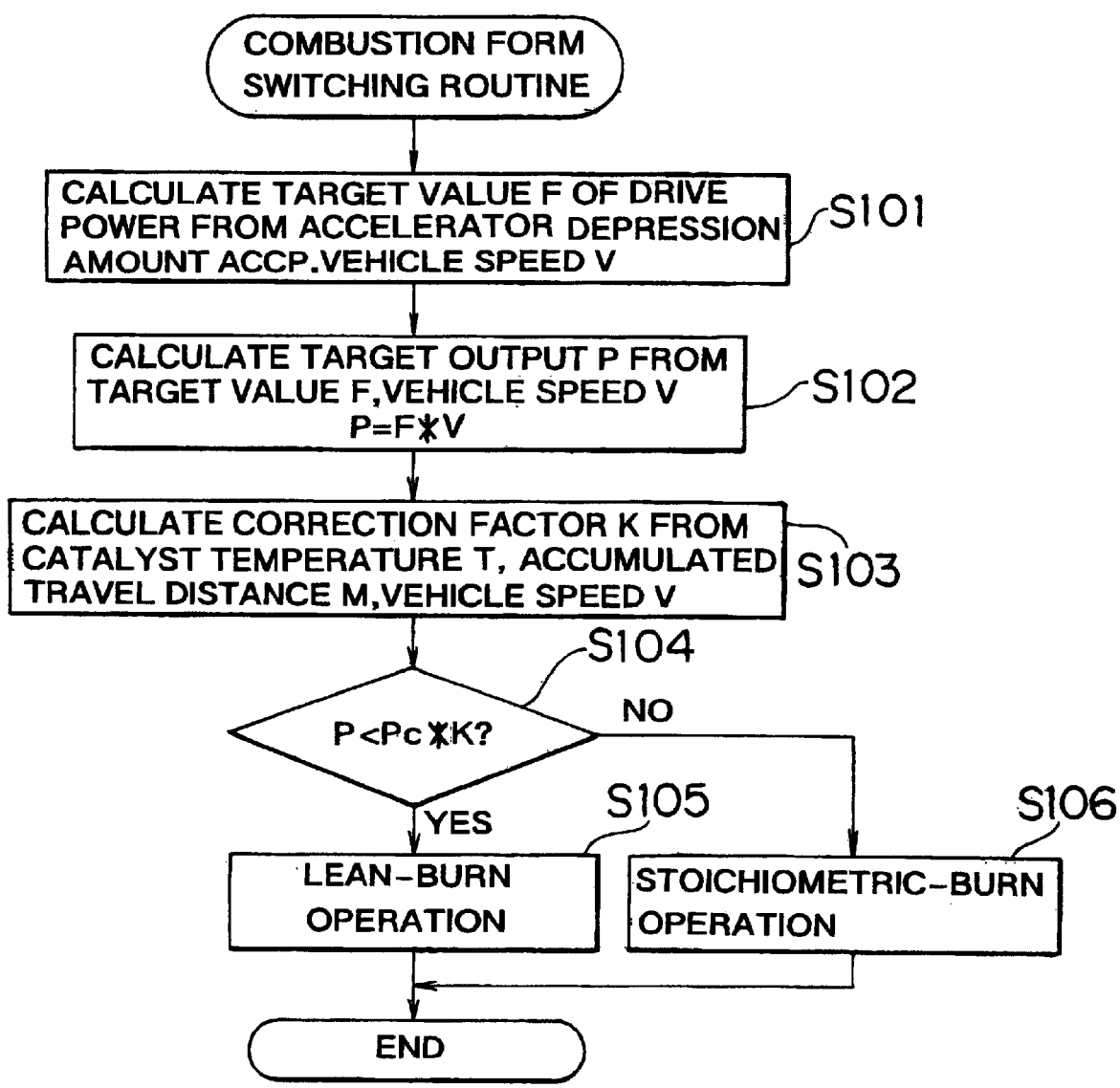
FIG. 5 is a flowchart illustrating a procedure of switching the form of combustion.

An electrical construction of a drive power control apparatus in accordance with the embodiment will be described with reference to FIG. 3.

The drive power control apparatus includes the ECU 92 for overall control (coordinative control) of the engine 11 and the continuously variable transmission 2. The ECU 92 is formed as an arithmetic logic circuit having a ROM 93, a CPU 94, a RAM 95, a backup RAM 96, etc.

The ROM 93 is a memory in which various control programs, maps that are referred to during execution of the various programs, etc. are stored. The CPU 94 executes computing operations based on the various programs, the maps and the like stored in the ROM 93. The RAM 95 is a memory for temporarily storing results of computations by the CPU 94, data input from various sensors, etc. The backup RAM 96 is a non-volatile memory for storing data that needs to be retained during a stop of the engine 11. The ROM 93, the CPU 94, the RAM 95, and the backup RAM 96 are interconnected via a bus 97, and are connected to an external input circuit 98 and an external output circuit 99 via the bus 97.

The external input circuit 98 is connected to the vehicle speed sensor 4, the crank position sensor 14c, the accelerator position sensor 26, the catalyst temperature sensor 35, the vacuum sensor 36, etc. The external output circuit 99 is connected to the continuously variable transmission 2, the throttle motor 24, the fuel injection valve 40, etc.

The thus-constructed ECU 92 changes the form of combustion of the engine 11 between the stoichiometric burn in which a mixture is burned at the stoichiometric air-fuel ratio, and the lean burn in which a mixture that is fuel-leaner than a stoichiometric air-fuel ratio mixture is burned. That is, in order to achieve a combustion form that realizes a fuel consumption performance that is optimal to bring the drive power of the motor vehicle 1 to a requested value, (target value), the ECU 92 changes the form of combustion in accordance with a target output determined as an engine output for bringing the drive power of the motor vehicle 1 to the target value. Due to the changing between the combustion forms, the stoichiometric-burn operation is performed when the target output is high. When the target output is low, the lean-burn operation is performed.

Next, the manner of controlling the torque of the engine 11 in each one of the lean burn form and the stoichiometric burn form will be described.

The ECU 92 calculates an injection amount command value based on the engine revolution speed NE determined from the detection signal from the crank position sensor 14c, the load factor KL described below, etc. Then, the ECU 92 drives and controls the fuel injection valve 40 so that an amount of fuel corresponding to the injection amount command value is injected into the combustion chamber 16. The injection amount command value become greater values as the load factor KL becomes greater. Therefore, with increases in the load factor KL, the amount of fuel injected from the fuel injection valve 40 increases, and therefore the output torque of the motor vehicle 1 increases.

The load factor KL used for the calculation of the injection amount command value is a value that represents the proportion of the present load to the maximum engine load of the engine 11. During the stoichiometric burn operation, the load factor KL is calculated by using the intake pressure PM determined based on the detection signal from the vacuum sensor 36. Therefore, during the stoichiometric-burn operation, by controlling the degree of throttle opening based on the target value of engine torque so as to control the intake pressure PM (amount of intake air) of the engine 11, the amount of fuel injected from the fuel injection valve 40 is changed, so that the output torque of the engine 11 is controlled.

During the lean-burn operation of the engine, the ECU 92 calculates an injection amount command value based on the engine revolution speed NE, the load factor KL, etc., similarly to the processing during the stoichiometric-burn operation. Then, the ECU 92 drives and controls the fuel injection valve 40 so that an amount of fuel corresponding to the injection amount command value is injected into the combustion chamber 16. However, during the lean-burn operation, the load factor KL is calculated based on the target value of engine torque and the like, instead of the intake pressure PM and the like. The injection amount command value during the lean-burn operation calculated based on the load factor KL and the like increases with increases in the load factor KL. Therefore, with increases in the injection amount command value, the amount of fuel injected from the fuel injection valve 40 increases, and therefore, the output torque of the engine 11 increases. Hence, during the lean-burn operation, the output torque of the engine 11 is controlled by controlling the amount of fuel injection based on the target value of engine torque.

During the lean-burn operation, NOx in exhaust is adsorbed to the NOx storage-reduction catalyst 33*a*, so that the NOx emissions are lessened. The ECU 92 estimates an amount of NOx stored in the NOx storage-reduction catalyst 33*a* based on the injection amount command value, the engine revolution speed NE, and the air-fuel ratio, etc. When the estimated amount of NOx stored becomes equal to or greater than an allowable value, the ECU 92 executes a rich spike control of temporarily shifting the air-fuel ratio to a fuel-rich side. Due to the rich burn caused by the rich spike control, NOx stored in the NOx storage-reduction catalyst 33*a* is reduced to $N_2$ by HC and the like present in exhaust, thereby substantially preventing NOx saturation of the NOx storage-reduction catalyst 33*a*.

Furthermore, the ECU 92 changes the allowable value used for determining whether to execute the rich spike control, in accordance with changes in the NOx storing capability of the NOx storage-reduction catalyst 33*a*, that is, in accordance with a parameter that affects the NOx storing capability. Examples of the parameter that affects the NOx storing capability include the temperature of the NOx storage-reduction catalyst 33*a* determined from the detection signal from the catalyst temperature sensor 35, the degree of deterioration of the NOx storage-reduction catalyst 33*a* estimated from the accumulated travel distance of the motor vehicle 1, etc.

The ECU 92 gradually changes the allowable value to values that are further to the decrease side as the temperature of the NOx storage-reduction catalyst 33*a* increases and therefore the NOx storing capability of the catalyst 33*a* decreases. As a result, the frequency of performing the rich spike control during the lean-burn operation increases; so that the fuel consumption involved in the rich spike control during a predetermined period becomes great. Furthermore, the ECU 92 gradually changes the allowable value further to the decrease side, with increases in the accumulated travel distance of the motor vehicle 1 and progress of the deterioration of the NOx storage-reduction catalyst 33*a*, and therefore with decreases in the NOx storing capability of the catalyst 33*a*. As a result, the frequency of performances of the rich spike control during the lean-burn operation increases, so that the fuel consumption involved in the rich spike control during a predetermined period becomes great.

Next, a procedure of switching the form of combustion in the engine 11 will be described with reference to the flowchart of FIG. 15 illustrating a combustion form switching routine. The combustion form switching routine is executed, for example, by a time interrupt at every predetermined time.

In step S101 of the combustion form switching routine, the ECU 92, the ECU 92 calculates a target value F of the drive power requested of the motor vehicle 1 based on the accelerator depression amount ACCP and the vehicle speed V of the motor vehicle 1 determined from the detection signal from the vehicle speed sensor 4. The thus-calculated target value F gradually decreases with increases in the vehicle speed V under a condition that the accelerator depression amount ACCP is constant. The target value F gradually increases with increases in the accelerator depression amount ACCP under a condition that the vehicle speed V is constant. As the processing of step S102, the ECU 92 calculates a target output P by multiplying the vehicle speed V by the target value F.

Next, as the processing of step S103, the ECU 92 calculates a correction factor K based on the temperature of the NOx storage-reduction catalyst 33*a* (catalyst temperature T), the accumulated travel distance M, the vehicle speed V, etc. The thus-calculated correction factor K gradually changes to values on a decrease side as the catalyst temperature T increases. Furthermore, as the accumulated travel distance M rises, and as the vehicle speed V becomes higher, the correction factor K gradually changes to values on the decrease side. As the processing of subsequently step S104, the ECU 92 determines whether Expression (1) presented below holds, that is, whether the target output P is smaller than the value ("Pc*K") obtained by correcting the pre-set output value Pc through the use of the correction factor K.

In the processing of step S104 and the subsequent steps the combustion form switching routine, the ECU 92 selects and accomplishes a form of combustion that will achieve a most favorable fuel consumption performance to adjust the engine output so that the drive power of the motor vehicle 1 will reach the target value F, that is, the requested value. That is, in the processing of step S104 and the subsequent steps, the ECU 92 determines whether Expression (1) holds. If Expression (1) holds, the ECU 92 commands execution of the lean-burn operation.

If Expression (2) does not hold, the ECU 92 commands execution of the stoichiometric-burn operation.

$$P<Pc*K \qquad (1)$$

P: target output

Pc: output value

K: correction factor

In Expression (1), the target output P is an engine output for bringing the drive power of the motor vehicle 1 to a requested value (target value F). The target output P is calculated by the processing of steps S101 and S102. The output value Pc is pre-set based on the minimum fuel consumption rate during the stoichiometric-burn operation and the minimum fuel consumption rate during the lean-burn operation determined through experiments or the like. The output value Pc serves as a criterion for determining whether to switch the combustion form. The correction factor K is calculated by the processing of step S103. The output value Pc is a factor for correcting the output value Pc.

If it is determined that "P<Pc*K" in the processing of step S104, the ECU 92 commands execution of the lean-burn operation. After that, the ECU 92 temporarily ends the combustion form switching routine. Upon commanding the execution of the lean-burn operation, the ECU 92 drives the throttle motor 24, the fuel injection valve 40, etc., so as to control the degree of throttle opening, the amount of fuel injection, etc. to values that are suitable to the lean-burn operation.

During the lean-burn operation, the ECU 92 controls the torque of the engine 11 to a target value by performing a fuel injection amount control based on the target value of the engine torque for achieving the target output P, and at the same time, controls the speed ratio of the continuously variable transmission 2 so as to achieve an engine revolution speed NE (input rotation speed of the continuously variable transmission 2) that optimizes the fuel consumption performance when the engine output is made equal to the target output P. By controlling the torque of the engine 11 and the speed ratio of the continuously variable transmission 2 as described above, it becomes possible to bring the engine output to the target output P, and cause the drive power of the motor vehicle 1 to reach the target value F, that is, a requested value, and maintain good fuel consumption performance of the engine 11 during the lean-burn operation.

Conversely, if it is determined in the processing of step S104 that "P<Pc*K" does not hold, the ECU 92 commands execution of the stoichiometric-burn operation in the processing of step S106. After that, the ECU 92 temporarily ends the combustion form switching routine. Upon commanding the execution of the stoichiometric-burn operation, the ECU 92 controls the throttle motor 24, the fuel injection valve 40, etc. so as to control the degree of throttle opening, the amount of fuel injection, etc. to values suitable to the stoichiometric-burn operation.

During the stoichiometric-burn operation, the ECU 92 controls the torque of the engine 11 to a target value by performing a throttle opening control based on the target value of the engine torque for achieving the target output P, and at the same time, controls the speed ratio of the continuously variable transmission 2 so as to achieve an engine revolution speed NE (input rotation speed of the continuously variable transmission 2) that optimizes the fuel consumption performance when the engine output is made equal to the target output P. By controlling the torque of the engine 11 and the speed ratio of the continuously variable transmission 2 as described above, it becomes possible to bring the engine output to the target output P, and cause the drive power of the motor vehicle 1 to reach the target value F, that is, a requested value, and maintain good fuel consumption performance of the engine 11 during the stoichiometric-burn operation.

A method of determining the output value Pc used in the processing of step S104 (Expression (1)) for selecting a combustion form will be described with reference to the graph shown in FIG. 6.

First, the minimum fuel consumption rate of the engine 11 during the stoichiometric-burn operation is calculated for each of various engine outputs. That is, the stoichiometric-burn operation is executed, and the engine revolution speed NE is adjusted so as to minimize the fuel consumption rate while controlling the engine output to a predetermined target output P. The fuel consumption rate at the minimum is measured as a minimum fuel consumption rate as mentioned above. Furthermore, the measurement of a minimum fuel consumption rate as described above is performed a plurality of times by suitably varying the value of the target output P. Thus, a tendency of transition of the minimum fuel consumption rate during the stoichiometric-burn operation with respect to changes in the engine output is determined. The thus-determined tendency of transition of the minimum fuel consumption rate during the stoichiometric-burn operation is indicated by a solid line L1 in FIG. 6.

The minimum fuel consumption rate of the engine 11 during a lean-burn operation in which the rich spike control is not performed is calculated for each one of various engine outputs. That is, the lean-burn operation is performed, and the engine revolution speed NE is adjusted so as to minimum the fuel consumption rate while the engine output is controlled to a predetermined target output P. The fuel consumption rate at the minimum is measured as a minimum fuel consumption rate as mentioned above. Furthermore, the measurement of a minimum fuel consumption rate as described above is performed a plurality of times by suitably varying the value of the target output P. Thus, a tendency of transition of the minimum fuel consumption rate during the lean-burn operation in which the rich spike control is not performed, with respect to changes in the engine output, is determined. The thus-determined tendency of transition of the minimum fuel consumption rate during the lean-burn operation (without the rich spike control) is indicated by a broken line L2 in FIG. 6.

Figure 6:
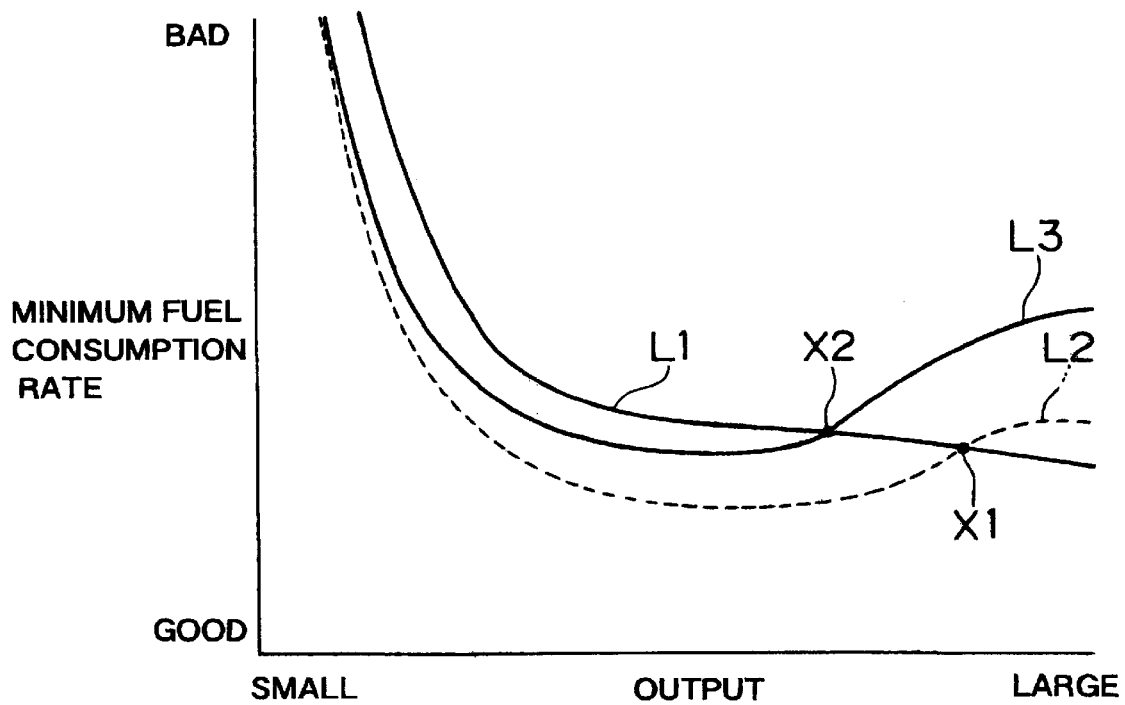
FIG. 6 is a graph indicating transition of the minimum fuel consumption rate during the stoichiometric-burn operation, transition of the minimum fuel consumption rate during the lean-burn operation without the rich spike control, and transition of the minimum fuel consumption rate during the lean-burn operation with the rich spike control, with respect to changes in the engine output.

As can be understood from FIG. 6, both the minimum fuel consumption rate (solid line L1) during the stoichiometric-burn operation and the minimum fuel consumption rate (broken line L2) during the lean-burn operation without the rich spike control gradually change toward better values as the engine output increases, within a region of small engine outputs. Furthermore, in the region of small engine outputs, the minimum fuel consumption rate (broken line L2) during the lean-burn operation without the rich spike control reaches better values than the minimum fuel consumption rate (solid line L1 during the stoichiometric-burn operation). Conversely, in a region of great engine outputs, the minimum fuel consumption rate (broken line L2) during the lean-burn operation without the rich spike control gradually changes to values that are further to the deteriorated side as the engine output increases. On a high output side of a point X1 in the graph, the minimum fuel consumption rate (L1) during the stoichiometric-burn operation reaches better values than the minimum fuel consumption rate (L2) during the lean-burn operation without the rich spike control.

Furthermore, the minimum fuel consumption rate of the engine 11 during a lean-burn operation in which the rich spike control is performed at a frequency corresponding to the NOx storing capability of a new NOx storage-reduction catalyst 33a is also calculated simultaneously with the minimum fuel consumption rate during the lean-burn operation without the rich spike control.

Furthermore, in the calculation of the minimum fuel consumption rate during the lean-burn operation without the rich spike control, the amount of NOx adsorbed to the NOx storage-reduction catalyst 33a per unit time is calculated based on the engine revolution speed NE and the amount of fuel injection for determining a then target output P. The amount of NOx adsorbed per unit time is multiplied by a time consumed to calculate the minimum fuel consumption rate during the lean-burn operation without the rich spike control, so that a total amount of NOx adsorbed during the period of calculation is calculated. The total amount of NOx adsorbed is divided by an allowable value of the amount of NOx stored into a NOx storage-reduction catalyst 33a in a brand new condition, so that the number of times of executing the rich spike control during the aforementioned time period of calculation. It is possible to pre-determine an extra amount of fuel consumed for each one of the rich spike controls executed from a state in which the engine output has been controlled to the target output P. Therefore, by multiplying the extra amount of fuel consumed by the number of times of executing the rich spike control, the total extra amount of fuel consumed for the rich spike control during the aforementioned time period of calculation is calculated. A minimum fuel consumption rate during a lean-burn operation in which the rich spike control is executed at the aforementioned frequency is calculated based on the total extra amount of fuel consumption calculated as described above, and the minimum fuel consumption rate during the lean-burn operation without the rich spike control.

The above-described calculation of minimum fuel consumption rates is performed every time the target output P is suitably changed, so as to determine the tendency of transition of the minimum rate of fuel consumption during the lean-burn operation with the rich spike control with respect to changes in the engine output. The thus-determined tendency of transition of the minimum fuel consumption rate during the lean-burn operation (with the rich spike control) is indicated by a solid line L3 in FIG. 6. As for the method of calculating the minimum fuel consumption rate during the lean-burn operation with the rich spike control, it is also possible to adopt a method other than the above-described method in which the minimum fuel consumption rate during the lean-burn operation with the rich spike control is determined based on the minimum fuel consumption rate during the lean-burn operation without the rich spike control and the extra amount of fuel consumption involved in the rich spike control which is determined through calculation. For example, the tendency of transition (L3) of the minimum fuel consumption rate during the lean-burn operation with the rich spike control with respect to changes in the engine output may also be determined by actually executing the lean-burn operation with the rich spike control, and measuring the minimum fuel consumption rate, and executing the measurement a plurality of times, with the target output P being suitably changed.

As indicated in FIG. 6, the minimum rate (L3) of fuel consumption with the rich spike control provides worse values than the minimum rate (L2) of fuel consumption without the rich spike control. Therefore, a point X2 at which the minimum rate (L3) of fuel consumption with the rich spike control and the minimum rate (L1) of fuel consumption during the stoichiometric-burn operation become equal is on an engine output decrease side of the point X1. In a region on the low output side of the point X2 in FIG. 6, the minimum fuel consumption rate (L3) during the lean-burn operation with the rich spike control provides better values than the minimum fuel consumption rate (L1) during the stoichiometric-burn operation. Furthermore, in a region on the higher output side of the point X2 in FIG. 6, the minimum fuel consumption rate (L1) during the stoichiometric-burn operation provides better values than the minimum fuel consumption rate (L3) during the lean-burn operation with the rich spike control.

Let it assumed herein that the lean-burn operation is performed when the target output P is in the region on the low output side of the point X1, and the stoichiometric-burn operation is performed when the target output P is on the high output side of the point X1. Then, if the rich spike control is performed at a frequency corresponding to the NOx storing capability of a new NOx storage-reduction catalyst 33a when the target output P is in a region between the point X1 and the point X2, the minimum fuel consumption rate during the lean-burn operation changes from the state indicated by the broken line L2 to the state indicated by the solid line L3, corresponding to the extra amount of fuel consumption involved in the rich spike control. As a result, the minimum fuel consumption rate (L3) during the lean-burn operation becomes worse than the minimum fuel consumption rate (L1) during the stoichiometric-burn operation. Therefore, the changing of the combustion form in the above-described manner cannot achieve a sufficient improvement in the fuel consumption performance of the engine 11.

In this embodiment, therefore, the engine output corresponding to the point X2 is set as an output value Pc (a value used as a criterion for determining which one of the combustion forms to select) used in Expression (1). Then, the value "Pc*K" obtained by multiplying the output value Pc by the correction factor K is compared with the target output P. If "P<Pc*K", execution of the lean-burn operation is commanded. If "P<Pc*K" does not hold, execution of the stoichiometric-burn operation is commanded. Therefore, the form of combustion of the engine 11 is determined in accordance with the output value Pc set based on the minimum fuel consumption rate (L1) during the stoichiometric-burn operation, and the minimum fuel consumption rate (L3) during the lean-burn operation in which the fuel consumption involved in the rich spike control is taken into:account, and the like. Thus, by designating a combustion form in accordance with whether Expression (1) holds at the target output P when the engine output is being controlled to the target output P, a combustion form that achieves best fuel consumption performance can be precisely selected and accomplished even if the rich spike control is performed during the lean-burn operation.

The execution frequency of the rich spike control executed during the lean-burn operation is changed in accordance with changes in the NOx storing capability of the NOx storage-reduction catalyst 33a. When the execution frequency of the rich spike control is changed in accordance with the NOx storing capability, the minimum fuel consumption rate (L3) during the lean-burn operation with the rich spike control also changes. Therefore, the ECU 92 is able to vary the output value Pc ("Pc*K") in accordance with the NOx storing capability by changing the correction factor K used for the correction of the output value Pc in Expression (1) in accordance with changes in the NOx storing capability. More specifically, in the processing of step S103 (FIG. 5) in the combustion form switching routine, the ECU 92 calculates a correction factor K in accordance with a parameter that affects the NOx storing capability, for example, the temperature of the NOx storage-reduction catalyst 33a (catalyst temperature T), the degree of deterioration thereof, etc. The degree of deterioration of the NOx storage-reduction catalyst 33a is estimated from, for example, the accumulated travel distance M of the motor vehicle 1.

The NOx storing capability decreases as the catalyst temperature T increases. The NOx storing capability decreases as the deterioration of the NOx storage-reduction catalyst 33a progresses (as the accumulated travel distance M increases). As the NOx storing capability decreases,the execution frequency of the rich spike control becomes higher, so that the minimum fuel consumption rate (L3) during the lean-burn operation with the rich spike control shifts upward in FIG. 6. Therefore, the correction factor K is set to values further toward the decrease side as the catalyst temperature T increases. The,correction factor K is set to values further toward the decrease side with progress of the deterioration of the NOx storage-reduction catalyst 33a.

If the correction factor K that is increased and decreased as described above is used to change the output value Pc ("Pc*K"), the criterion value ("Pc*K") for determining which one of the forms of combustion to select gradually decreases toward the lower output side of the point X2 in FIG. 6 as the NOx storing capability decreases. Therefore, as the NOx storing capability decreases, the execution frequency of the rich spike control increases, and therefore the minimum fuel consumption rate (L3) during the lean-burn operation (with the rich spike control) shifts upward in the graph. Correspondingly, the value "Pc*K" changes toward the lower output side as the NOx storing capability decreases. Hence, by selecting the form of combustion based on whether Expression (1) employing the value "Pc*K" is met or unmet, a form of combustion that achieves a best fuel consumption performance can be precisely selected.

Besides the NOx storing capability, drivability is also taken into account in calculating the correction factor K. In the control of the engine output to the target output P, the drivability varies between a case where the lean-burn operation is performed and a case where the stoichiometric-burn operation is performed. As an example of the parameter that affects the drivability, the vehicle speed V of the motor vehicle 1 may be cited. As the vehicle speed V becomes greater, the drivability in a high engine output region during the lean-burn operation deteriorates to a greater extent.

Therefore, in the processing of step S103 (FIG. 5) in the combustion form switching routine, the ECU 92 calculates the correction factor K as a value further toward the decrease side as the vehicle speed V is greater. Correspondingly, the output value Pc ("Pc*K") that is variable by the correction factor K changes toward the low output side. Therefore, although the drivability on the high engine output side during the lean-burn operation deteriorates as the vehicle speed V increases, the value "Pc*K" is correspondingly changed to values that are further toward the low output side, so that the upper limit of the engine output region where the lean-burn operation is executed changes toward the low output side. Since the value ("Pc*K") that serves as a criterion for determining whether to switch the combustion form is variable in accordance with the vehicle speed V, selection of a form of combustion is performed in such a manner that the drivability during the lean-burn operation will not excessively deteriorate.

The embodiment, in which the above-described processes are performed, achieves the following advantages.

The output value Pc serving as a criterion for determining whether to switch the form of combustion is determined based on the minimum fuel consumption rate (L1 during the stoichiometric-burn operation, and the minimum fuel consumption rate (L3) during the lean-burn operation in which the fuel consumption involved in the rich spike control is taken into account. That is, an engine output (corresponding to the point X2 in FIG. 6) at which the minimum fuel consumption rate (L3) during the lean-burn operation with the rich spike control and the minimum fuel consumption rate (L1) during the stoichiometric-burn operation become equal is determined as an output value Pc mentioned above. By selecting a form of combustion based on whether Expression (1) employing the output value Pc is met or unmet, it is possible to precisely select and accomplish a form of combustion that achieves a best fuel consumption performance in terms of the control of the engine output to the target output P. Hence, in the motor vehicle 1 equipped with the engine 11 in which the rich spike control is performed during the lean-burn operation, it becomes possible to precisely improve the fuel consumption performance of the engine 11.

The execution frequency of the rich spike control is changed in accordance with changes in the NOx storing capability of the NOx storage-reduction catalyst 33a. Therefore, in accordance with changes in the NOx storing capability, the minimum fuel consumption rate (L3) during the lean-burn operation with the rich spike control also changes. However, the correction factor K for correcting the output value Pc is increased or decreased based on the parameter that affects the NOx storing capability, that is, the catalyst temperature T, the accumulated travel distance M (the degree of deterioration of the catalyst 33a), etc. Therefore, as the NOx storing capability changes in accordance with the catalyst temperature T or the accumulated travel distance M, the execution frequency of the rich spike control changes. Hence, even though the minimum rate (L3) of fuel consumption with the rich spike control changes, the value ("Pc*K") that serves as a criterion for determining whether to switch the form of combustion can be changed to an appropriate value. Therefore, by selecting a form of combustion based on whether Expression (1) employing the value "Pc*K" is met or unmet, it becomes possible to more precisely select and accomplish an optimal form of combustion irrespective of changes in the NOx storing capability.

In the control of the engine output to the target output P, the drivability during the lean-burn operation and the drivability during the stoichiometric-burn operation differ from each other. During the lean-burn operation, the drivability in a high engine output region deteriorates more as the vehicle speed V increases. However, the correction factor K for correcting the output value Pc is increased or decreased in accordance with the vehicle speed V. That is, the correction factor K is set to values that are further to the decrease side, as the vehicle speed V increases. As a result, although the drivability deteriorates in the high engine output region during the lean-burn operation as the vehicle speed V increases, the value "Pc*K" can be changed toward the low output side so that the upper limit of the engine output region where the lean-burn operation is executed is correspondingly shifted toward the low output side. Therefore, by selecting a form of combustion based on whether Expression (1) is met or unmet, it becomes possible to select a form of combustion in such a manner that the drivability during the lean-burn operation will not excessively deteriorate.

The embodiment may be modified, for example, in the following manners.

Although in the embodiment, the degree of deterioration of the NOx storage-reduction catalyst 33a is estimated from the accumulated travel distance M of the motor vehicle 1, it is also practicable to estimate the degree of deterioration of the NOx storage-reduction catalyst 33a based on a different basis, for example, an accumulated operation time of the engine 11. In this case, as the accumulated operation time of the engine 11 increases, a greater degree of deterioration of the NOx storage-reduction catalyst 33a is estimated. It is also practicable to provide a NOx sensor for detecting the NOx concentration in exhaust at the downstream side of the NOx storage-reduction catalyst 33a in the exhaust passage 33 and to estimate the degree of deterioration of the NOx storage-reduction catalyst 33a based on the detected NOx concentration. In this case, as the NOx concentration detected by the NOx sensor increases, a greater degree of deterioration of the NOx storage-reduction catalyst 33a is estimated.

In the embodiment, the output value Pc that serves as a criterion value for determining whether to switch the form of combustion is determined beforehand through experiments or the like, and the thus-determined output value Pc is used in Expression (1). However, this manner of operation does not restrict the invention. That is, in accordance with the invention, it is also practicable to determine the output value Pc during operation of the motor vehicle 1 after the engine 11 is installed in the motor vehicle 1, and to use the thus-determined output value Pc in Expression (1). In this case, individual variations of the motor vehicle 1, the engine 11, etc., if any variation exists, are taken into account in determining the output value Pc, and the thus-determined output value Pc is used in Expression (1). Therefore, an appropriate value of the output value Pc can be determined irrespective of individual variations of the motor vehicle 1, the engine 11 and the like. Hence, by selecting a form of combustion based on whether Expression (1) is met or unmet, it becomes possible to more precisely improve the fuel consumption performance and curb deterioration in drivability.

In the embodiment, the execution frequency of the rich spike control is changed by estimating the amount of NOx stored in the NOx storage-reduction catalyst 33a, and executing the rich spike control when the amount of NOx stored reaches or exceeds an allowable value, and varying the allowable value in accordance with changes in the NOx storing capability. However, this does not restrict the invention. For example, it is also practicable to allow the execution frequency of the rich spike control to be varied by executing the rich spike control at every predetermined time irrespective of the amount of NOx stored, and by changing the interval of execution of the rich spike control in accordance with changes in the NOx storing capability.

In the embodiment, in the calculation of the minimum fuel consumption rate during the lean-burn operation with the rich spike control that is used for determining an output value Pc, the minimum fuel consumption rate is calculated on the assumption that the rich spike control is executed at a frequency corresponding to the NOx storing capability of the NOx storage-reduction catalyst 33a in a brand new condition. However, this is not restrictive in the invention. For example, the minimum fuel consumption rate may also be calculated on an assumption that the rich spike control is executed at a frequency corresponding to the NOx storing capability of the NOx storage-reduction catalyst 33a occurring after a predetermined time of use. In this case, the manner of calculating the correction factor K for correcting the output value Pc is changed to a manner based on the aforementioned assumption.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. A drive power control apparatus of a vehicle, comprising:

an internal combustion engine that changes a combustion form between a lean burn operation and a stoichiometric burn operation and that performs a rich spike control of temporarily shifting an air-fuel ratio to a fuel-rich air-fuel ratio during the lean burn operation;

a continuously variable transmission connected to an output shaft of the internal combustion engine;

a Nox storage-reduction catalyst provided in an exhaust system of the internal combustion engine; and a controller which determines a target output of the engine for bringing a drive power of the vehicle to a target value and controls a torque of the internal combustion engine and a speed ratio of the continuously variable transmission so that an actual output of the internal combustion engine reaches the target output, wherein the controller performs: 1) the lean burn operation when the target output is less than an output value set based on a minimum fuel consumption rate during the stoichiometric burn operation and a minimum fuel consumption rate during the lean burn operation in which a fuel consumption involved in the rich spike control is taken into account, 2) the stoichiometric burn operation when the target output is greater than the output value and 3) the rich spike control to reduce a NOx stored in the NOx storage-reduction catalyst.

2. A control apparatus according to claim 1, wherein the controller determines the minimum fuel consumption rate during the stoichiometric burn operation and the minimum fuel consumption rate during the lean burn operation in which the fuel consumption involved in the rich spike control is taken into account, during an operation of the vehicle, and the controller calculates the output value based on the minimum fuel consumption rate during the stoichiometric burn operation and the minimum fuel consumption rate during the lean burn operation.

3. A control apparatus according to claim 2, wherein the minimum fuel consumption rate during the lean burn operation in which the fuel consumption involved in the rich spike control is taken into account is calculated based on a minimum fuel consumption rate during the lean burn operation without the rich spike control, and an extra amount of fuel consumption involved in the rich spike control.

4. A control apparatus according to claim 1, wherein the controller changes an execution frequency of the rich spike control in accordance with a change in a NOx storing capability of the NOx storage-reduction catalyst, and wherein the controller controls the output value in accordance with the change in the NOx storing capability of the NOx storage-reduction catalyst.

5. A control apparatus according to claim 4, further comprising a detector that detects a temperature of the NOx storage-reduction catalyst, wherein the controller decreases the output value with increases in the temperature of a NOx storage-reduction catalyst.

6. A control apparatus according to claim 4, further comprising an estimator that estimates a degree of deterioration of the NOx storage-reduction catalyst, wherein the controller decreases the output value with increases in a degree of deterioration.

7. A control apparatus according to claim 1, wherein the controller changes an execution frequency of the rich spike control in accordance with a change in a NOx storing capability of the NOx storage-reduction catalyst, and wherein the controller controls the output value in accordance with the change in the NOx storing capability of the NOx storage-reduction catalyst, and a speed of the vehicle.

8. A drive power control method in a vehicle having an internal combustion engine that changes a combustion form between a lean burn operation and a stoichiometric burn operation that performs a rich spike control of temporarily shifting an air fuel ratio to a fuel rich air fuel ratio during a lean burn operation, and a continuously variable transmission connected to an output shaft of the internal combustion engine, the method for controlling a torque of the internal combustion engine and a speed ratio of the continuously variable transmission so that an actual output of the internal combustion engine reaches the target output, the method comprising:

determining, as the target output, an output of the engine for bringing a drive power of the vehicle to a target value;

determining an output value of the internal combustion engine for selecting the combustion form based on a minimum fuel consumption rate during a stoichiometric burn operation and a minimum fuel consumption rate during a lean burn operation in which a fuel consumption involved in the rich spike control is taken into account;

performing the lean burn operation when the target output is less than the output value, and performing the stoichiometric burn operation when the target output is greater than the output value; and performing the rich spike control so as to reduce a NOx stored in the NOx storage-reduction catalyst provided in the exhaust system of the internal combustion engine.

9. A control method accordance to claim 8, wherein the rich spike control is performed at a predetermined frequency in accordance with a change in a NOx storing capability of the NOx storage-reduction catalyst, and wherein the minimum fuel consumption rate during the lean-burn operation used for determining the output value is calculated taking into account an amount of fuel consumed when the rich spike control is performed at the frequency corresponding to a predetermined state of the NOx storing capability of the NOx storage-reduction catalyst.

10. A control method according to claim 9, wherein the output value is changed in accordance with the change in the NOx storing capability of the NOx storage-reduction catalyst.

11. A control method according to claim 9, wherein the output value is changed in the NOx storing capability and a speed of the vehicle.

12. A drive power controller apparatus for an internal combustion engine and a continuously variable transmission connected to the internal combustion engine, the controller apparatus comprising:

a lean burn operation of the internal combustion engine that includes a rich spike control which temporarily shifts an air-fuel ratio from a lean burn operation to a fuel-rich operation;

a stoichiometric burn operation of the internal combustion engine;

a controller that controls a torque of the internal combustion engine and a speed ratio of the continuously variable transmission so that an actual output of the internal combustion engine reaches a target output for bringing a drive power of the vehicle to a target value, wherein the controller performs:

1) the lean burn operation when the target output is less than an output value set based on a minimum fuel consumption rate during the stoichiometric burn and a minimum fuel consumption rate during the lean burn; and 2) the stoichiometric burn operation when the target output is greater than the output value.

13. A method for controlling a torque of an internal combustion engine so that an actual output of the internal combustion engine reaches a target output, the method comprising:

obtaining a target output of the internal combustion engine for bringing a drive power of the vehicle to a target value;

setting an output value of the internal combustion engine based on a minimum fuel consumption rate in a stoichiometric burn operation and a minimum fuel consumption rate in a lean burn operation that includes a rich spike control fuel consumption, the rich spike control temporarily shifting an air-fuel ratio to a fuel-rich air-fuel ratio; and performing the lean burn operation when the target output is less than the output value, and performing the stoichiometric burn operation when the target output is greater than the output value.

* * * * *